Jan. 28, 1969     H. L. RATLIFF, JR     3,424,511
WIDE-ANGLE STEREOVIEWER

Filed June 27, 1966     Sheet 1 of 3

INVENTOR
Harvey L. Ratliff Jr.

INVENTOR
Harvey L. Ratliff Jr.

United States Patent Office 3,424,511
Patented Jan. 28, 1969

---

3,424,511
WIDE-ANGLE STEREOVIEWER
Harvey L. Ratliff, Jr., Oxon Hill, Md., assignor to Jetru Inc., Amarillo, Tex.
Filed June 27, 1966, Ser. No. 560,531
U.S. Cl. 350—135                       3 Claims
Int. Cl. G02b 27/22

ABSTRACT OF THE DISCLOSURE

A panoramic viewer with a large curved picture slot for panoramic stereo re-creation coacting with wide-angle oculars having divergent optical axes which enables substantially distortion-free wide-angle viewing.

---

My present invention comprises an improvement in stereoscopic or panoramic viewers. The principal object of the present invention is to provide an extremely wide angle viewer which may be purchased at a very low price and operated by people with very little skill, effort or care.

A fundamental aspect of the present invention is to deliberately, on a predetermined basis, embody oculars in the viewer that have the following relation with their respective object plane $$K \cong \theta/Y$$

(see Equation 3 hereinafter).

This relation is described in detail hereinafter and is the essential ingredient of the invention. Because of this relation many benefits can be achieved such as the ones set forth under "objects" hereof.

Wide-angle stereoscopic or panoramic re-creation presents a number of problems to workers in the art. As is well known, the rays entering the eyes of a viewing observer from the oculars of the stereoscope must enter the eye either parallel or diverging no more than is required at the distance of distinct vision. As far as the price of producing a wide-angle stereoscope is concerned this is a very critical problem.

It is therefore, another object to provide a viewer which supports a picture surface in a wide angular relation when the oculars have fairly short focal lengths. This is, of course, consistent with the principal object of the invention.

Another factor which is important is the size of the picture. It is therefore, another object to provide a viewer which is operative with picture elements of relatively small sizes.

Still another object of the present invention is to provide a viewer which makes it a naturally flowing reaction of the user to place the oculars immediately adjacent each eye whereby relatively small lenses (i.e., 0.9 inch in diameter) can provide the wide angle of view.

Other objects and advantages of my invention will become apparent from a study of the following description taken with the accompanying drawings wherein.

Figure 4:
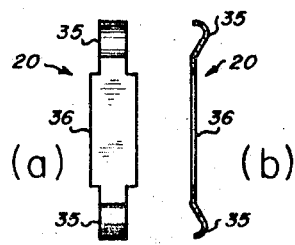
FIG. 4(a) is a plan view of the picture locating spring 20 which is inserted in socket 5 of FIG. 1 when the viewer is assembled.
FIG. 4(b) is a side view of the spring of FIG. 4(a).

FIG. 4(c) is a top view of the spring 20 inserted in socket 5, shown in section, to show the details of the socket 5 and its relation to spring 20.

Figure 1:
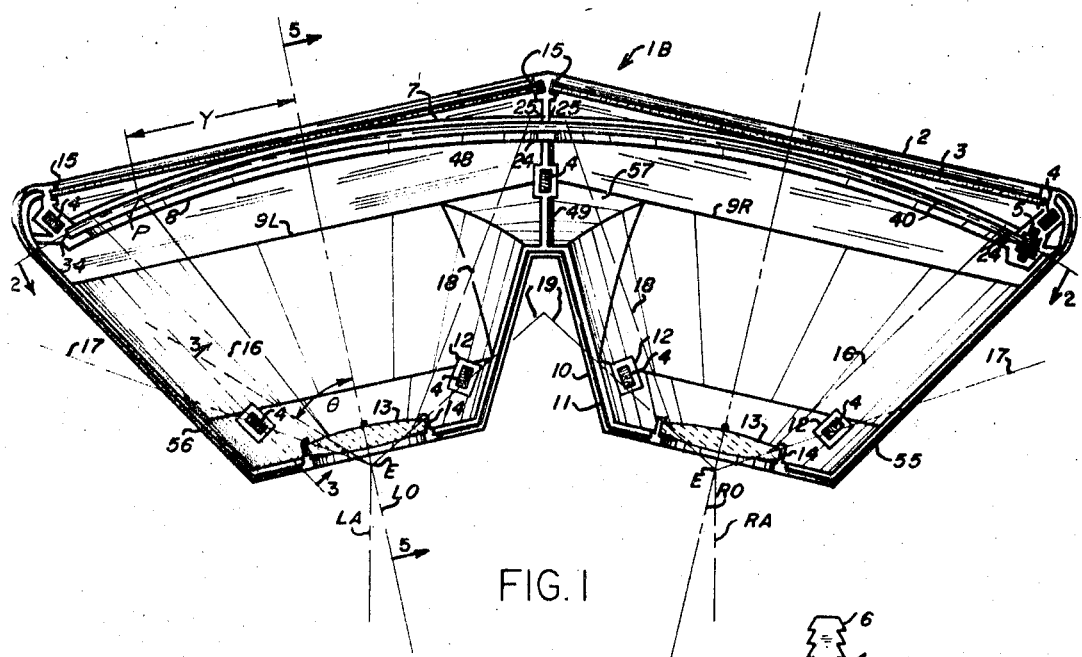
FIG. 1 is a plan view of the lower section 1B of the viewer V.
Figure 5:
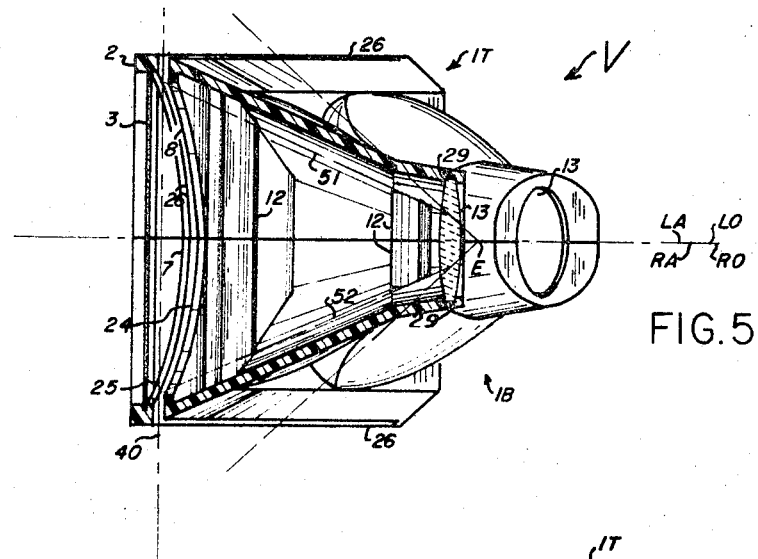

FIG. 5 is a sectional view taken along line 5—5 of FIG. 1.

Figure 6:
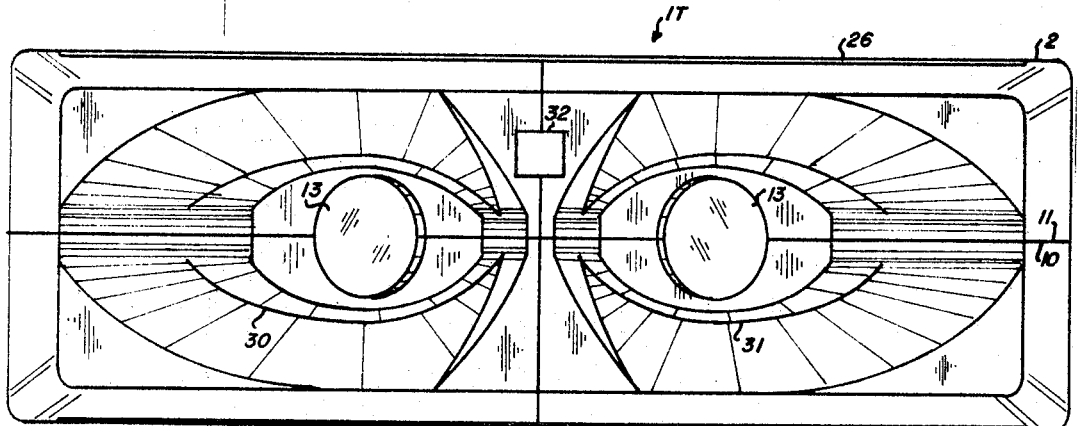

FIG. 6 is a rear view of the viewer V.

Figure 7:
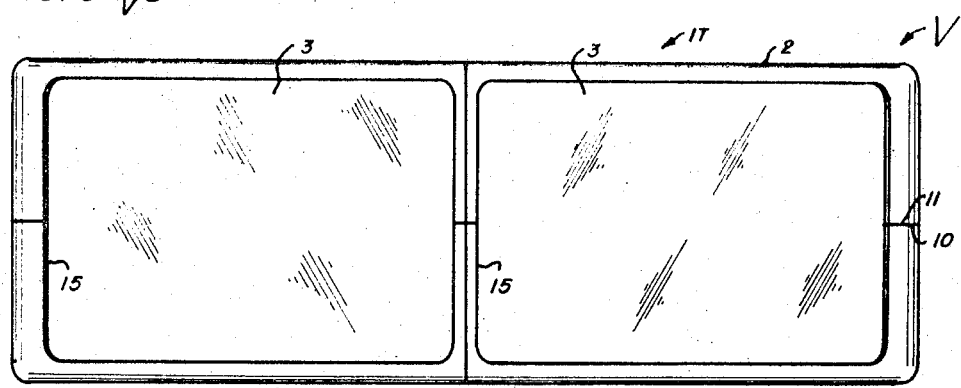

FIG. 7 is a reduced front view of the viewer V.

Figure 8:
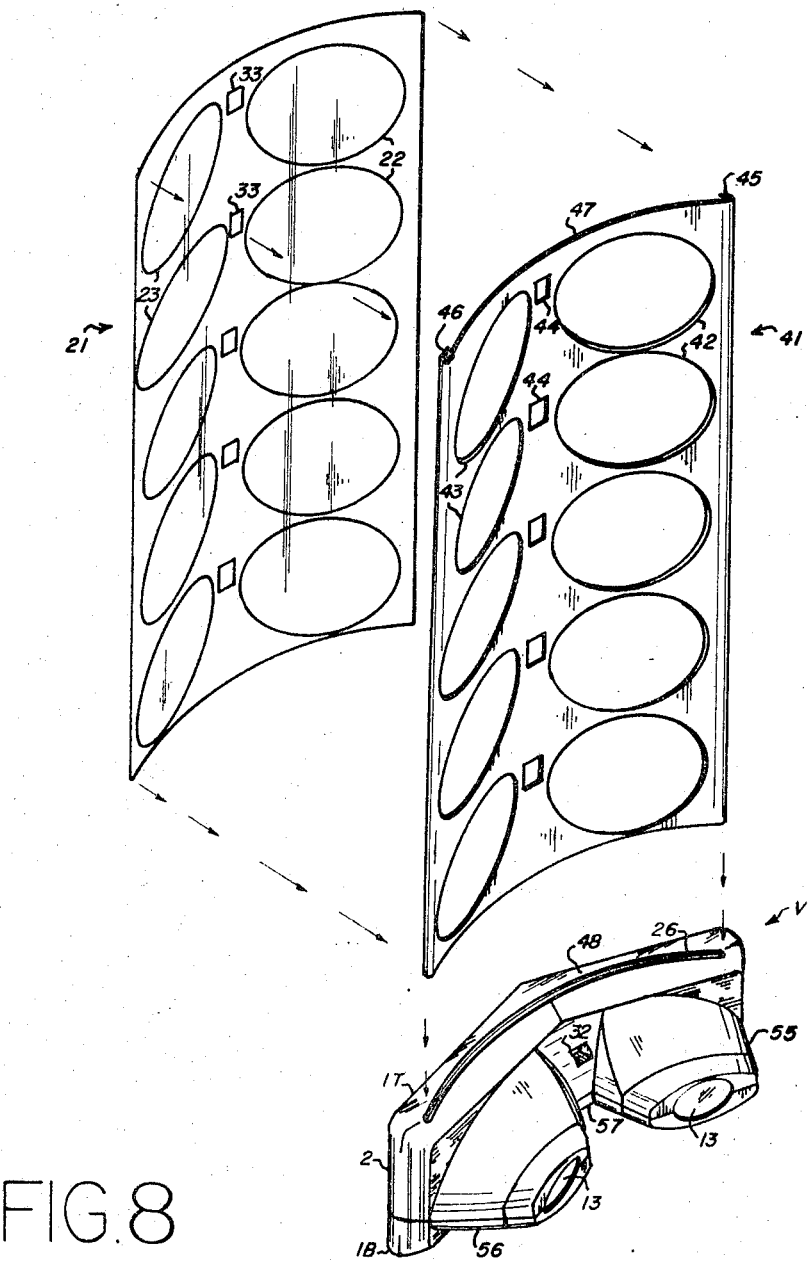

FIG. 8 is a perspective view of the viewer V, picture holder 41, and picture element 21 showing the manner of insertion.

Figure 2:
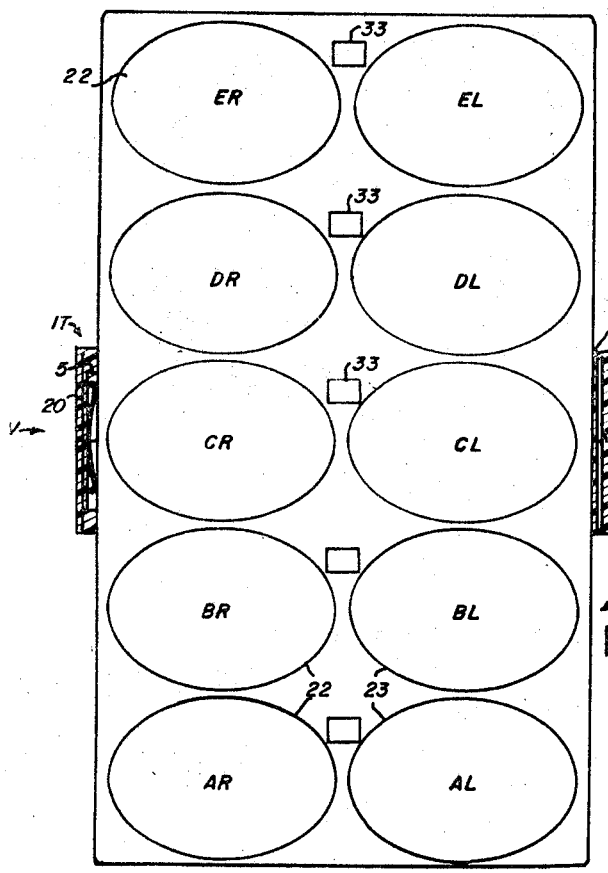
FIG. 2 is an expanded view taken along the line 2—2 of FIG. 1 with the picture element inserted after the top section 1T is combined with 1B to form V.
Figure 3:
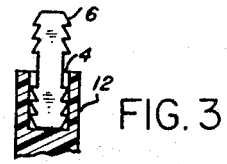
FIG. 3 is an enlarged, vertical section taken substantially along line 3—3 of FIG. 1, with the prong strip fastener 6 inserted.

In the preferred contemplated form of the invention a plurality of left eye view pictures 23 and a plurality of right eye view pictures 22 are printed in "continuous tone" on picture element 21 as shown in FIG. 2 and FIG. 8. It is preferable that the picture element be of stiff paper which is thin enough to be substitutable for a transparency whether or not the picture element is used with a diffusing screen. The optical centers of 23 and 22 are on the recording axes corresponding to LO and RO, respectively. In the instant form of the invention they are of oval shape and are 3.4 inch wide and 2.3 inch high. The picture element may be slid directly into cylindrically shaped transverse slot 26, but better results are obtained if the picture element is inserted in holder 41, this being described in more detail hereinafter.

The pictures are recorded along axes corresponding to LO and RO in a compressed form such as is produced by a "fisheye" lens and as is described in more detail in my said prior application Ser. No. 343,841. The pairing of the views is indicated by the letters of FIG. 2, AL to EL, inclusive, indicating the first to the fifth left pictures 23 and AR to ER, inclusive, indicating the first to fifth right pictures 22. In the contemplated form the optical centers of 22 and 23 are 3.74 inch apart as measured on the surface of 21. Picture descriptions 33 are provided to give various information to the user as to the title or the like.

If picture holder 41 is used, the paper of 21 may be more flexible. Holder 41 comprises a cylindrically shaped stiff surface 47 which has the same cylindrical curvature as slot 26 (in the specific embodiment shown its radius of curvature is 8.25 inch), picture description apertures 44, picture apertures 43 to allow the user to see pictures 23, picture apertures 42 to allow the user to see pictures 22, and picture fasteners 45 and 46.

The viewer V comprises two portions, a bottom portion 1B and a top portion 1T. Each of portions 1B and 1T comprise a casing 2 which supports seven posts 12 having correspondingly seven sockets 4 therewithin each for receiving seven prong strip fasteners 6 to fasten 1B to 1T.

Casing 2 is shaped with ocular tubes 55 and 56 which extend relatively far behind the picture containing portion 48 and support four right and left ocular supporting shoulders 14 and four top and bottom ocular supporting grooves 29 at the rear of the ocular tubes 55 and 56. The ocular supports 14 and 29 support the ocular lenses 13 such that their optical axes are respectively LO and RO which may diverge from each other at a substantial angle (which in the case of the specific embodiment is 26° or 13° to the right of the axis of right eye view RA and 13° to the left of the axis of left eye view LA, RA and LA being parallel and substantially the interpupillary distance apart of 2.56 inches).

The casing 2 is made relatively thin above oculars 13 and the grooves 29 are placed therein to make the width from top to bottom small enough that ocular tubes 55 and 56 can be placed under the eyebrow and deep into the eye socket of the user so that the eyes of the user can be placed at positions E with reference to the oculars 13 as supported by viewer V. Also there is a deeply recessed portion 57 provided by the casing 2 of the viewer V to allow the nose of the user to protrude as far up as a position in close proximity to the picture portion 48 of the casing 2 of viewer V.

In each portion casing 2 provides a strengthening rib 49 connecting the ocular tube portion to the picture portion.

The picture portion 48 comprises right upper and lower walls 9R and left upper and lower walls 9L; respective front and rear picture supporting walls 7 and 8 with two apertures 25 and 24 which are substantially the same shape and size as pictures 22 and 23 and are symmetric about optical axes LO and RO; grooves 15 for supporting diffusing screens 3 (which in the case of printed picture elements could even be transparent since the paper the pictures are printed upon acts to diffuse the light); in addition to the posts 12 and sockets 4, the socket 5 is provided plus its corresponding post for holding picture positioning spring 20; and thusly as shown a transverse slot 26 symmetric about picture surface 40 which is (in the specific embodiment herein set forth) generated about a line which is perpendicular to and passes substantially through the intersection of LO and RO thereby having a radius of curvature which is some 8.25 inches.

The forms of the two portions 1B and 1T are (in the specific embodiment set forth herein) mirror reflections of each other with the exception that in 1B the high shoulder 11 is on the inside, while in 1T the high shoulder 11 is on the outside, the low recessed shoulders 10 being respectively on the outside and inside so that shoulder 11 of 1B fits into recessed shoulder 10 of 1T and shoulder 11 of 1T fits into recessed shoulder 10 of 1B (see FIG. 6).

The sockets 5 of 48 comprise the outer flat surface 38 and shoulders 37 which are flat and perpendicular to the plane of LO and RO.

The surface 34 is also flat and perpendicular to the plane of LO and RO.

Suitable lenses 13 are provided (in the specific embodiment set forth herein the lenses 13 are 2.36 inch focal length, 0.9 inch diameter and double convex lenses) which can have different outward appearances but which have a predetermined character that is set forth with reference to the ocular graph and Equation 3 hereinafter and which may be molded out of "acrylic" plastic or made in a well known manner.

There is provided suitable rectangular shaped screens 3.

There may be provided a picture positioning spring 20 which comprises a flat wide portion 36 which is narrow enough to fit into socket 5 but is too wide to rest against 38, and rounded spring portions 35 which are narrow enough to pass by shoulders 37.

For assembly the oculars 13 may be inserted in grooves 29 and supporting shoulders 14, screens 3 may be inserted into grooves 15, prong strip fasteners 6 may be inserted into sockets 4, and picture positioning spring 20 may be inserted in socket 5 either with its wide flat surface 36 outside spring portions 35 to rest against shoulders 37 as shown in FIG. 4(c), which is preferable.

Next the two portions may be slipped together with the prong strip fasteners 6 slipped into sockets 4, oculars 13 slipped into grooves 29 and supporting shoulders 14, screens 3 slipped into grooves 15, picture positioning spring 20 slipped into socket 5, and 10 and 11 each slipped into and received by respectively 11 and 10 of the other portion such as 1T.

For assembly of the picture element 21 with the picture holder 41, the right and left edges of 21 may be respectively inserted in fasteners 45 and 46, such that pictures 22 and 23 register with apertures 42 and 43 respectively and picture descriptions 33 register with apertures 44.

For viewing the holder 41 with the picture element 21 therein or the picture element 21 alone may be inserted in slot 26. Spring 20 coacts with back support 7 and the supports (i.e., 37) in slot 5 to push the left edge of 41 (or 21) against 34. Since 34 and 37 are perpendicular to the plane of LO and RO and the optical centers of 22 and 23 lie on a line which is perpendicular to the left edge of 41 (or 21), spring 20 assures that the optical centers of 22 and 23 are in a plane parallel to the plane of LO and RO. Slots, to assure registry of optical centers with optical axes, may be provided in the right edge of 41 to allow the rounded portions 35 of spring 20 to slip thereinto when the optical centers of 22 and 23 register with RO and LO, respectively. However, this is not necessary since it is pretty obvious when the optical centers are in substantial registry.

It can be seen that in the specific contemplated structural arrangement of the invention set forth herein, the distance along the optical axes from the centers of the lenses 13 to the optical centers of the pictures (when registered with apertures 24 and 25) is some 2.16 inches.

It can be made obvious from the lens formula that:

$$1/o + 1/i = 1/f$$
$$1/2.16 + 1/i = 1/2.36$$
$$1/i = 0.424 - 0.463 = -0.039$$
$$i = -25.6 \text{ inch}$$

where:

$f$=focal length (i.e., 2.36 inches),
$o$=object distance (i.e., 2.16 inches),
$i$=image distance (i.e., −25.6 inches).

Therefore, the shortest virtual image distance created by the stereoscope is some 25.6 inches which is far enough beyond the distance of distinct vision.

It can be seen also that the distance along right and left peripheral rays 18 and 16 from (points also within the plane passing through the centers of the lenses and perpendicular to their respective optical axes RO and LO) to the right and left peripheral edges of the respective pictures is some 2.35 inches.

It can also be seen from the lens formula that:

$$1/o + 1/i = 1/f$$
$$1/2.35 + i/i = 1/2.36$$
$$i \cong \infty$$

Therefore, the peripheral rays 18 and 16 enter the eyes parallel (for practical purposes).

It can be clearly seen herefrom that if picture surface 40 was not cylindrically curved similarly to the surface set forth herein, the right and left peripheral portions of the pictures would be completely out of focus to the stereoscope user.

Still further it can be seen that the distance along upper and lower peripheral rays 51 and 52 from (points also within the plane described hereinabove) to the upper and lower peripheral edges of the respective pictures is some 2.35 inches. Therefore, the peripheral rays 51 and 52 enter the eyes parallel (for practical purposes). It is here noted that if the vertical picture width were made greater than some 2.3 inches, the peripheral portions would be out of focus due to the flat character thereof.

Applicant has found that if pictures taken by the image compressing "Nikon Fisheye" lens or taking lenses of an equivalent type wherein the taking lens graph applies are enlarged to a diameter of some 5 inches, the image when viewed through an image expanding 2.36 inch focal length double convex lens (if the optical center of the picture is substantially on the optical axis of the lens) is expanded in its angular eye entering character to such an extent that there is not noticeable distortion (the characteristic curved lines associated with "barrel distortion" are not present) and the image appears orthoscopic.

According to the manufacturer of the "Nikon Fisheye" lens (i.e., page 12 of their instruction booklet "How to Use Fisheye Nikkor"), there is a straight line relation between Y (the distance of an image point from the picture center) and $\theta$ (the "zenith angle" which is the angle between the optical axis and the entering image ray corresponding to the image point) which is as follows:

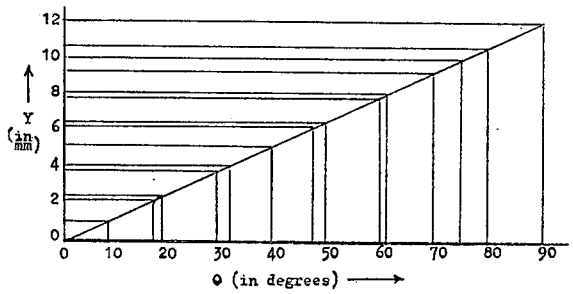

Applicant has found that his 2.36 inch F.L. image expanding lens substantially eliminates noticeable distortion when the picture of the preceding graph of the taking lens is enlarged as shown in the following graph.

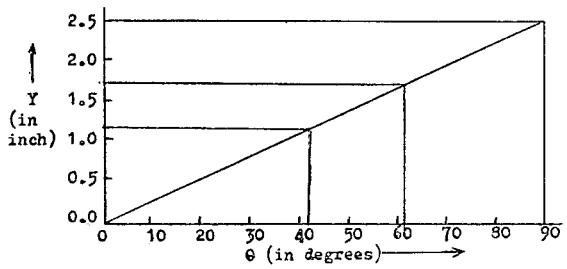

It can be seen that if the 24 mm. recorded image is enlarged some 5.3 times in a linear manner to a some 5 inch image, the expanded rays will have substantially the same angular configuration as the rays entering the taking lens had before compression took place.

If (for the latter ocular graph) $\theta$ is defined with reference to FIG. 1, it is the angle a ray, entering one of the eyes at E of an observer looking into the viewer, makes with the optical axis of the ocular 13 that this eye at E is looking into; if Y is defined with reference to FIG. 1, it is the distance from the optical center of the object plane of this said ocular 13 to the point of origin P of this ray as measured along said object plane; and if the slope-intercept formula is applied to the ocular graph, then:

$$Y \cong m\theta \quad (1)$$

If the experimentally predetermined property of the ocular (enabling the substantially straight line relation between Y and $\theta$ for values of $\theta$ between 0° and 42.5°+) is labelled K, then $m \cong 1/K$ and from Eq. 1:

$$Y \cong \theta/K \quad (2)$$

or $$K \cong \theta/Y \quad (3)$$

So, the ocular of this device thusly has the property of K which has a substantially constant value when $\theta$ is from 0° to more than 42.5° off the optical axis of the ocular.

In the specific design of the ocular of the ocular graph, $K \cong 36°/\text{inch}$.

It can therefore be seen that 3.4 inch diameters represent: $\theta \cong (3.4 \text{ inches}) (36°/\text{inch}) \cong 122°$.

122° angles of view and that 2.3 inch diameters represent:

$$\theta \cong (2.3 \text{ inches}) (36°/\text{inch}) \cong 83°$$

83° angles of view noting the inherent inverse relation between K and F.L. whereby K would be greater if F.L. is less.

Since the optical axes are diverged 26° in the specific embodiment herein set forth, the horizontal angle of steroscopic re-creation is: $122° + 26° = 148°$, some 148°, and the vertical angle of stereoscopic re-creation is 83°.

It is noted that inside peripheral rays 19 make: $61° - 13° = 48°$, some 48° angles with the axes of right and left eye view (RA and LA). Therefore, rays 19 intersect at a point in front of eyes at E which is:

$$X = \cot (48°) \times \frac{2.56}{2} = 1.15 \text{ inches}$$

some 1.15 inches from a line joining E. This closely approximates the real life situation, since the nose of a viewing observer protrudes almost this far in front of his eyes.

It can now be seen that a depth of stereoscopic vision is provided by the viewer from some 1.15 inches in front of E to infinity and that an angle of peripheral re-creation is provided by the viewer of some 148°. This is almost as good as the eyes actually see in any real life situation.

It can also be seen that the invention provides these remarkable re-creations for the user at very inexpensive prices and that little effort, skill or care is required of the user.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:
1. A wide-angle panoramic viewing device for re-creating substantially distortion-free panoramic views, comprising: a housing; a pair of wide-angle oculars supported at the rear of said housing having their optical axis laterally displaced such that they pass approximately through the respective centers of the eyes of a normal viewer looking thereinto, and making a predetermined and operative angle with respect to each other, each of said oculars introducing substantially the following predetermined relation over a field of view greater than 42.5° off their respective optical axis:

$$K \cong \theta/Y$$

where: $\theta$ is the angle a ray entering one of said eyes makes with the optical axis of the corresponding one of said oculars, Y is the distance from the optical center of the focal plane of said one of said oculars to the point of origin of said ray measured along a line perpendicular to the optical axis of said one of said oculars and passing through said optical center, and K is a predetermined property of the ocular which has a predetermined value that is substantially constant from 0° to more than 42.5° off the optical axis of the ocular;

transverse slot means for transversely receiving and supporting a picture upon each focal plane of each of said oculars; and opening means for making visible each focal plane in said slot over values of $\theta$ from 0° to more than 42.5° as seen through said oculars.

2. The device of claim 1 wherein said optical axes intersect to the rear of said oculars.

3. The device of claim 1 wherein said slot has a cylindrical configuration which is generated about a line which is perpendicular to both said optical axes and passes approximately through the intersection of said optical axes.

(References on following page)

References Cited

UNITED STATES PATENTS

| | | | |
|---|---|---|---|
| 2,093,520 | 9/1937 | Hayashi | 350—134 X |
| 2,326,718 | 8/1943 | Mast | 350—135 |
| 2,674,920 | 4/1954 | Bennett | 350—135 |
| 2,834,251 | 5/1958 | Romrell | 350—135 |
| 2,953,980 | 9/1960 | Montebello | 350—133 |
| 2,955,156 | 10/1960 | Heilig | 350—133 |

FOREIGN PATENTS 546,968  3/1955  Italy.

OTHER REFERENCES

Van Alabada: "A Wide-Angle Stereoscope and a Wide-Angle Viewfinder," Transactions of the Optical Society of London, vol. 25, 1923–24, pp. 249–257, 259, 260.

DAVID SCHONBERG, *Primary Examiner.*

P. R. GILLIAM, *Assistant Examiner.*

U.S. Cl. X.R.

350—239